Patented May 12, 1931

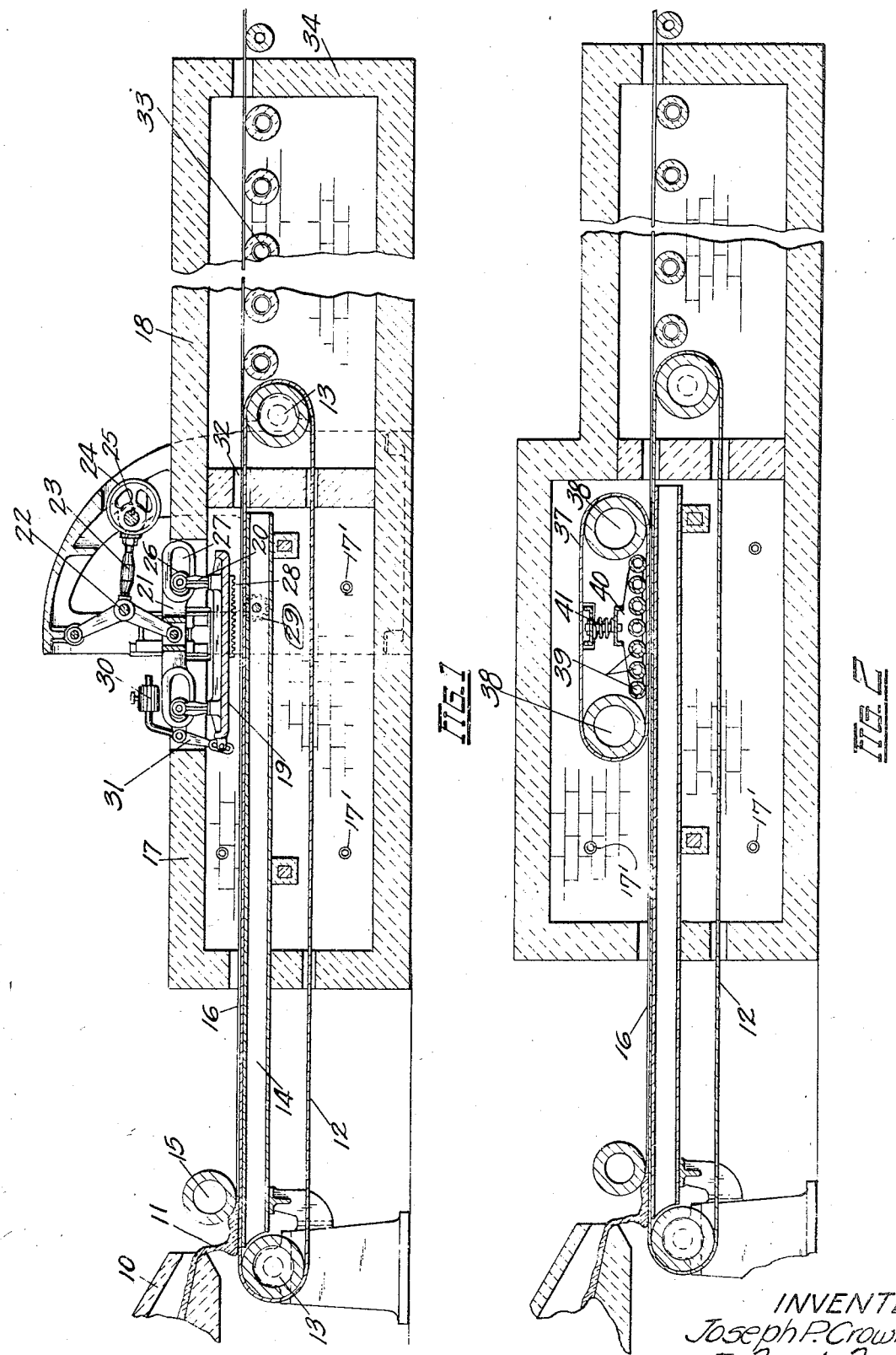

1,805,206

UNITED STATES PATENT OFFICE

JOSEPH P. CROWLEY, OF TOLEDO, OHIO, ASSIGNOR TO LIBBEY-OWENS-FORD GLASS COMPANY, OF TOLEDO, OHIO, A CORPORATION OF OHIO

SHEET GLASS APPARATUS

Application filed November 22, 1924. Serial No. 751,418.

The present invention relates to sheet glass apparatus, and has particular reference to means for continuously manufacturing a flat blank which may be ground and polished to give a satisfactory sheet of plate glass.

An important object of the invention is to provide apparatus wherein a quantity of plastic glass may be rolled into substantially flat formation, after which the ribbon or sheet thus formed is pressed to a uniform thickness so that the blanks can be very easily and quickly surfaced to give a sheet of plate glass.

A further object of the invention is to provide sheet glass apparatus wherein a quantity of plastic glass is rolled into flat sheet form, after which the sheet is reheated and pressed to a uniform thickness and then passed through an annealing leer to condition the same for the purposes of grinding and polishing.

A still further object of the invention is to provide apparatus for producing blanks from which plate glass may be made, the said blanks having a uniform thickness and being of any desired size, depending upon the size of the apparatus used.

Other objects and advantages of the invention will become apparent during the course of the following description.

In the drawings wherein like numerals are employed to designate like parts throughout the same.

Fig. 1 is a longitudinal vertical section through one form of apparatus which may be used, and Fig. 2 is a similar view of a slightly modified form.

Heretofore plate glass has been produced by rolling a quantity of plastic glass upon a table after which the blank thus formed is ground and polished. Although it is possible to produce a relatively large blank by this rolling out process, the blank formed is relatively uneven so that it must be made substantially thicker than the thickness of the desired finished sheet, thus allowing for the removal of wave and other irregular formations by the grinding and polishing machines.

In the present invention means are provided whereby it is possible to produce a blank of nearly any size which is so formed that it may be of substantially the same thickness as the desired thickness of the finished sheet, because of its uniform thickness, thereby minimizing the amount of grinding and polishing necessary to give a first-class piece of plate glass.

Referring to the drawings, in Fig. 1 the numeral 10 designates the discharge spout or slab of a suitable glass tank or furnace which is capable of discharging a quantity of molten or plastic glass 11 upon the movable endless table 12. The table 12 is preferably formed from a heat-resisting non-corrosive alloy such as nichrome, monel, stellite, etc. Such a belt can be given a very high polish which will not materially affect the surface of the glass formed thereon. The movable table or belt 12 is operable around rotatable drums 13. The upper horizontal run of the belt moves upon a supporting member 14 which is likewise provided with an upper flat surface upon which the belt travels, said belt being supported thereon. The supporting member may be internally cooled by a continuous flow of a cooling medium if desired.

The glass 11 falling upon the table is flattened out or rolled by means of a relatively highly polished roller 15, which will give a sheet 16 of substantially the desired thickness or slightly larger than the desired thickness of the finished sheet. Although the roller 15 makes the sheet 16 substantially flat, it will be found that the sheet is comparatively uneven, and to overcome the unevenness to make the sheet uniform, I employ suitable pressing means to make the sheet absolutely uniform in its thickness.

As is shown in Fig. 1, the movable table or belt 12 is passed through a chamber 17 containing one or any desired number of gas burners or the like 17', and also a chamber 18. The chamber 17 is used as a reheating chamber for the purposes of reheating the sheet 16, after it has been rolled to substantially the desired thickness. The numeral 18 designates a chamber which is called an annealing leer for conditioning the sheet after it has been formed.

Arranged in the reheating chamber 17 is a pressing member or table 19 disposed above the movable belt 12 and adapted to be moved to and from the table in a manner to press the sheet into uniform thickness. The pressing member 19 is supported by a pair of links 20 slidably engageable with a cross-arm 21 which is caused to be moved up and down by a toggle connection 22. The arm 23 of the toggle has connection with a belt or strap 24 engaging a cam 25, whereby upon rotation of the cam 25, the arm 23 will be reciprocated in a manner to operate the toggle for moving the pressing member 19 to and from the table, or in other words, up and down. To insure proper flattening of the sheet 16, the table 19 is adapted to be moved through a short space with the sheet while it is being pressed, and to accomplish this the arms 20 have the rollers 26 movable in the raceways 27 formed in the cross-beam 21. Associated with the table or pressing member 19 is a rack-bar 28 adapted to mesh with a driven pinion 29, whereby the table may be moved relatively to its operating mechanism and with the sheet to press the same to uniform thickness. A weight 30 is carried by the arm 31, and has connection with the pressing member 19 and cross-beam 21 to return the pressing member to an inoperative position. The cam and power pinion 29 can be rotated by any suitable means.

Thus, after the sheet 16 has been rolled under the rolling member 15, it is passed through the reheating chamber 17 where it is reheated in a manner that it can again be worked and pressed to a uniform thickness under the pressing head 19. The sheet is pressed between the head 19 and movable belt 12 which is supported by the rails 14, thus giving a perfectly flat sheet of uniform thickness. After that portion of the sheet in engagement with the pressing head 19 has been pressed the head is raised and moved back where it can again be brought into engagement with an unpressed portion of the sheet making it possible to continuously produce a ribbon or sheet of glass which has been rolled and pressed to uniform thickness. The pressed ribbon or sheet is then passed through an opening 32 into the annealing leer 18 where it is supported upon leer rolls 33. The sheet is discharged at the end 34 upon a cutting table or any desired apparatus which is not shown. The sheet can then be cut into separate sheet sizes of the desired dimensions after which it can be ground and polished in any suitable manner. Due to the condition of the sheet formed in the machine disclosed in Fig. 1, the time required for the grinding and polishing has been greatly reduced, while at the same time there has been no sacrifice of time in the formation of blanks from which the sheet is produced.

In Fig. 2 the same form of apparatus may be used except that the pressing mechanism utilizes an endless, preferably non-corrosive, heat-resisting metal alloy belt 37 which is operable around the driving drums 38. Arranged between the two horizontal runs of the flattening belt 37 are a plurality of small rolls 39, by which means the belt 37 can be held against vertical movement when the sheet 16 is being passed thereunder. The rolls 39 are supported on a carriage 40 which may be urged downwardly by a sufficiently strong spring 41 as shown. With this type of construction the belt 12, sheet 16 and pressing belt 37 are all operable at the same speed so that there is no relative movement between the various parts. The sheet, after passing between the two belts, will be of uniform thickness and ready for surfacing.

From the foregoing it will be seen that a mass of molten or plastic glass is rolled into substantially flat form, after which it is pressed to a flat sheet of uniform thickness, and is then ground and polished. Due to the uniformity in thickness the sheet blank can be formed substantially to the dimensions of the desired finished sheet, making it easier to grind and polish the surfaces to give the requisite finish, as the grinding machine used will not be called upon to remove any surface defects such as waves and other irregularities.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. Means for pressing a moving sheet of glass to a substantially flat uniform thickness, including a substantially horizontal movable conveyer for supporting said sheet, a pressing member mounted above said sheet, a horizontal supporting member for the pressing member, arms carried by the pressing member and having rollers movably supported by the supporting member, and means for moving the pressing member horizontally with respect to said supporting member when said pressing member is in engagement with the sheet.

2. Means for pressing a moving sheet of glass to a substantially flat uniform thickness, including a substantially horizontal movable conveyer for supporting said sheet, a pressing member mounted above said sheet, a horizontal supporting member for the pressing member, arms carried by the pressing member and having rollers movably supported by the supporting member, means for moving the pressing member horizontally with respect to said supporting member when said pressing member is in engagement with the sheet, and a weight for returning the pressing member to its starting position when it is moved out of engagement with the sheet.

3. Means for pressing a moving sheet of glass to a substantially flat uniform thickness, including a substantially horizontal movable conveyer for supporting said sheet, a pressing member mounted above said sheet, a horizontal supporting member for the pressing member, arms carried by the pressing member and having rollers movably supported by the supporting member, means for moving the pressing member horizontally with respect to said supporting member when said pressing member is in engagement with the sheet, and means for moving the supporting member and pressing member vertically as a unit toward and away from the sheet.

4. Means for pressing a moving sheet of glass to a substantially flat uniform thickness, including a substantially horizontal movable conveyer for supporting said sheet, a pressing member mounted above said sheet, a horizontal supporting member for the pressing member, arms carried by the pressing member and having rollers movably supported by the supporting member, means for moving the pressing member horizontally with respect to said supporting member when said pressing member is in engagement with the sheet, a weight for returning the pressing member to its starting position when it is moved out of engagement with the sheet, and means for moving the supporting member and pressing member vertically as a unit toward and away from the sheet.

5. Means for pressing a moving sheet of glass to a substantially flat, uniform thickness, including a substantially horizontally movable conveyor for supporting said sheet, a horizontal supporting member mounted above the conveyor, a pressing member also positioned above the conveyor and being movably supported by said supporting member, and means for moving the pressing member horizontally with respect to the supporting member when said pressing member is in engagement with the sheet.

6. Means for pressing a moving sheet of glass to a substantially flat, uniform thickness, including a substantially horizontally movable conveyor for supporting said sheet, a horizontal supporting member mounted above the conveyor, a pressing member also positioned above the conveyor and being movably supported by said supporting member, means for moving the pressing member horizontally with respect to the supporting member when said pressing member is in engagement with the sheet, and means for returning the pressing member to its starting position when it is moved out of engagement with the sheet.

7. Means for pressing a moving sheet of glass to a substantially flat, uniform thickness, including a substantially horizontally movable conveyor for supporting said sheet, a horizontal supporting member mounted above the conveyor, a pressing member also positioned above the conveyor and being movably supported by said supporting member, means for moving the pressing member horizontally with respect to the supporting member when said pressing member is in engagement with the sheet, and means for moving the supporting member and pressing member vertically as a unit toward and away from the sheet.

Signed at Toledo, in the county of Lucas, and State of Ohio, this 20th day of November, 1924.

JOSEPH P. CROWLEY.